US008359585B1

(12) United States Patent
Spinner et al.

(10) Patent No.: US 8,359,585 B1
(45) Date of Patent: Jan. 22, 2013

(54) INSTRUMENTATION ATS/TPS MITIGATION UTILIZING I/O DATA STREAM

(75) Inventors: Robert Spinner, East Northport, NY (US); William Harold Leippe, Coram, NY (US); James McKenna, Bohemia, NY (US); Timothy Fox, Bayshore, NY (US)

(73) Assignee: Advanced Testing Technologies, Inc., Happauge, NY (US)

( * ) Notice: Subject to any disclaimer, the term of this patent is extended or adjusted under 35 U.S.C. 154(b) by 1323 days.

(21) Appl. No.: 11/938,991

(22) Filed: Nov. 13, 2007

Related U.S. Application Data (60) Provisional application No. 60/881,075, filed on Jan. 18, 2007.

(51) Int. Cl.
  *G06F 9/44* (2006.01)
  *G06F 9/45* (2006.01)
(52) U.S. Cl. .................. 717/134; 717/135; 717/136
(58) Field of Classification Search .................. None
  See application file for complete search history.

(56) References Cited

U.S. PATENT DOCUMENTS

| | | | |
|---|---|---|---|
| 4,630,224 A | 12/1986 | Sollman | |
| 5,046,033 A | 9/1991 | Andreasen et al. | |
| 5,136,705 A | 8/1992 | Stubbs et al. | |
| 5,560,013 A * | 9/1996 | Scalzi et al. | 717/138 |
| 5,703,788 A | 12/1997 | Shei et al. | |
| 5,936,868 A | 8/1999 | Hall | |
| 5,978,584 A * | 11/1999 | Nishibata et al. | 717/134 |
| 6,279,131 B1 * | 8/2001 | Archambeau et al. | 714/737 |
| 6,286,134 B1 * | 9/2001 | Click et al. | 717/138 |
| 6,311,149 B1 * | 10/2001 | Ryan et al. | 703/21 |
| 6,349,377 B1 * | 2/2002 | Lindwer | 712/22 |
| 6,516,295 B1 * | 2/2003 | Mann et al. | 703/26 |
| 6,523,151 B2 | 2/2003 | Hekmatpour | |
| 6,654,950 B1 * | 11/2003 | Barnishan | 717/136 |
| 6,820,192 B2 * | 11/2004 | Cho et al. | 712/227 |
| 7,047,442 B2 | 5/2006 | Sutton | |

(Continued)

FOREIGN PATENT DOCUMENTS

GB 2150696 7/1985

OTHER PUBLICATIONS

Shany et al., Untilizaiton of the WISE and COBRA 1000/11 technologies for TPS transportability and reusable software without software changes or source code availability, publised by IEEE 2005, pp. 355-359.*

(Continued)

*Primary Examiner* — Thuy Dao
*Assistant Examiner* — Zheng Wei
(74) *Attorney, Agent, or Firm* — Brian Roffe (57) ABSTRACT

Methods and systems for obsolescence mitigation of electronic systems including hardware and software components, in particular methods and systems for managing obsolete instrument hardware and application software used in legacy Automated Test Systems (ATS) or Automatic Test Equipment (ATE). When one or more components of a test program set (TPS) has been rendered obsolete, migration to one or more replacement instruments without any impact to the TPS or other remaining legacy instruments in the ATE or ATS is obtained by a translator module interposed between the new instrument and the system bus for translating instructions for the obsolete instrument or set of instruments into instructions or procedures for the new instrument whereby the new instrument thus functions in the same manner as the obsolete instrument or set of instruments.

19 Claims, 3 Drawing Sheets

U.S. PATENT DOCUMENTS

| | | | |
|---|---|---|---|
| 7,197,417 B2 | 3/2007 | Pramanick et al. | |
| 7,219,337 B2 * | 5/2007 | Cannon et al. | 717/138 |
| 7,260,815 B1 * | 8/2007 | Chen et al. | 717/134 |
| 7,428,727 B2 * | 9/2008 | Alverson et al. | 717/134 |
| 7,451,350 B2 * | 11/2008 | Cherny et al. | 714/32 |
| 7,487,422 B2 * | 2/2009 | Stimson | 714/741 |
| 7,555,716 B2 * | 6/2009 | Agiwal | 715/264 |
| 7,624,379 B2 * | 11/2009 | Spinner | 717/124 |
| 7,703,088 B2 * | 4/2010 | Li et al. | 717/159 |
| 7,765,529 B1 * | 7/2010 | Singh et al. | 717/134 |
| 8,020,148 B2 * | 9/2011 | Robertsson | 717/124 |
| 2002/0083420 A1 * | 6/2002 | Zammit et al. | 717/135 |
| 2004/0102956 A1 * | 5/2004 | Levin | 704/2 |
| 2004/0177346 A1 * | 9/2004 | Cannon et al. | 717/136 |
| 2006/0156289 A1 * | 7/2006 | Spinner | 717/124 |
| 2007/0011664 A1 * | 1/2007 | Yamashita | 717/135 |
| 2007/0079296 A1 * | 4/2007 | Li et al. | 717/136 |
| 2007/0240114 A1 * | 10/2007 | Dallman | 717/124 |
| 2008/0127045 A1 * | 5/2008 | Pratt et al. | 717/104 |

OTHER PUBLICATIONS

Cathleen Kennedy, Development of a new interchangeable virtual instrument class specification, published by IEEE 2005, pp. 812-819.*

Ehud Shany, Life Extension for Automated Test Systems utilizing WinSoft Instrument System Emulator—WISE, published by IEEE 2003, pp. 486-489.*

Richard W. Craig, A Methodology for Addressing Support Equipment Obsolescence, published by IEEE AESS systems Magazine, May 2002, pp. 20-22.*

Drost et al., Anatomy of the Next Generation of ATE, published by IEEE, AutoTestCon 2005, pp. 560-569.*

Search Report from UK patent application No. GB 0600570.6 dated Apr. 21, 2006.

* cited by examiner

INSTRUMENTATION ATS/TPS MITIGATION UTILIZING I/O DATA STREAM

CROSS REFERENCE TO RELATED APPLICATION

This application claims priority under 35 U.S.C. §119(e) of U.S. provisional patent application Ser. No. 60/881,075 filed Jan. 18, 2007, the entire contents of which are incorporated by reference herein.

FIELD OF THE INVENTION

The present invention relates generally to methods and systems for obsolescence mitigation of electronic systems including hardware and software components, and more particularly to methods and systems for managing obsolete instrument hardware and application software used in legacy Automated Test Systems (ATS) or Automatic Test Equipment (ATE).

The present invention also relates generally to methods and tools used to enable migration to replacement instruments without any impact to Test Program Sets (TPS).

BACKGROUND OF THE INVENTION

Since the inception of automated test systems or automated test equipment, engineers have struggled with managing the life expectancy of the overall test system (and component instruments) against the life expectancy of the electronic equipment being tested.

These systems are an integration of disparate instruments and devices under a shared common operating environment and shared communication protocols to act as a single entity.

The test program set (TPS) is an integrated function of both test station system software, inclusive of test integration and development tools, and the end item application software or automatic test program sets developed to execute on a particular ATS or ATE.

There have similarly been embodied in these systems a number of test standards, test methods and philosophies, and test tools developed to deliver more cost effective solutions for single and multiple user environments. Early versions were typically company proprietary and often, no standard existed to guide interoperability of different products. Today's solutions leverage commercial technology and standards through the use of what is often termed open architecture; however, these solutions don't readily apply themselves to legacy systems.

As the useful life of automatic test systems is extended, instruments in such automatic test systems invariably become obsolete and need to be replaced with newer instruments that may not function within the legacy ATS architecture. For example, a new instrument may not have a compatible instruction set or communications interface to enable its use within the legacy automatic test system. Additionally, the interdependence of the test program and the ATS instruments further compounds the problem of new instrument insertion, and typically requires test program changes.

These factors make it cost prohibitive to introduce new instruments into a legacy automatic test system.

In order to deliver the most cost effective solution in the long term, namely continuous transparent obsolescence, each ATS subsystem or component needs to be protected from obsolescence, or at a minimum, its obsolescence rendered mitigatable.

Accordingly, the invention seeks to adopt what is reusable and can be replenished via multiple sources or can be duplicated in-house within the confines of the ATS and TPS boundaries.

OBJECTS AND SUMMARY OF THE INVENTION

It is an object of the present invention to provide new methods and systems for obsolescence mitigation of electronic systems including hardware and software components, and in particular, to provide new methods and systems for managing obsolete instrument or device hardware and application software used in legacy ATS and ATE.

Another object of the present invention to provide new methods and tools to enable migration to replacement instruments or devices without any impact to TPS.

In order to achieve these objects and others, a method for use of an electronic test system including hardware and software components while providing obsolescence mitigation comprises defining a method of identifying a new ATS instrument, providing tools to translate obsolete instrument instructions and converting instrument communication protocol.

The method in accordance with the invention is reconfigurable, and thus not limited to a specific instrument or device.

When one or more component(s) of the ATS has been rendered obsolete, the method and toolset are applied to allow for transparent replacement with no impact to TPS or any remaining components in the legacy system.

In one embodiment of the method for replacing one or more obsolete instruments in an ATE or ATS in accordance with the invention while maintaining functionality provided by each obsolete instrument and allowing continued use of test program sets including commands for the obsolete instrument, a new instrument or set of instruments is added to the ATE or ATS which is capable of providing the same functions as the obsolete instrument, the appropriate input/output pipe is monitored for instructions for the obsolete instrument, whenever an instruction for the obsolete instrument is detected, the instruction for the obsolete instrument is translated into an instruction or procedure for the new instrument or set of instruments, and the instruction or procedure is executed at the new instrument or set of instruments to provide the same functionality via the new instrument(s) as the obsolete instrument. Each obsolete instrument is processed independently and thus they can act in parallel in the legacy ATS. This allows multiple obsolete instruments to be replaced within the same legacy system. Single instructions replaced by procedures enable context sensitive solutions critical to reduce regression testing normally problematic for application test program sets.

More specifically, in one embodiment, the new instrument or set of instruments is coupled to a translator module whereby the translation of the instruction for the obsolete instrument is processed and may become a procedure or discrete instruction for the new instrument or set of instruments is accomplished via the translator module hardware and software. The translator module is thus coupled to the bus or input/output pipe. Also, the translator module is preferably provided with an instruction repository of instructions for the obsolete instrument and corresponding instructions for the new instrument or set of instruments, translation of the instruction for the obsolete instrument into an instruction for the new instrument or set of instruments may entail mapping the instruction for the obsolete instrument into an instruction for the new instrument using the instruction repository. The instruction repository is preferably re-configurable dependent on the obsolete instrument and/or the new instrument or set of instruments, or other factors.

In an ATE or ATS including a plurality of instruments, a bus for connecting the instruments together, and test program sets executable for those instruments, in accordance with the invention, a new instrument whose instructions are not executable by the test program sets can be added to the ATE or ATS, the new instrument being a replacement for an obsolete one of the plurality of instruments executable by the test program sets and being capable of similar functions as the obsolete instrument, and a translator module is interposed between the new instrument and the bus for translating instructions for the obsolete instrument into instructions for the new instrument or set of instruments whereby the new instrument or set of instruments thus functions in the same manner as the obsolete instrument. The translator module may include a communications interface analyzer for identifying instructions for the obsolete instrument and implementing an interface of the new instrument for required communications protocol. It can also include an instrument instruction translator coupled to the communications interface analyzer and having an instruction repository of instructions for the obsolete instrument and corresponding instructions for the new instrument or set of instruments and maps each identified instruction for the obsolete instrument into one or more instructions or a procedure for the new instrument or set of instruments.

Another method in accordance with the invention for enabling continued use of a test program set executed for a first set of instruments when at least one instrument of the first set is obsoleted and replaced by a new instrument to thereby form a second set of instruments, entails creating an instruction repository of instructions for the obsolete instrument and corresponding instructions for the new instrument, determining when the test program set generates an instruction for the obsoleted instrument, and when the test program set generates an instruction for the obsoleted instrument, mapping the instruction using the instruction repository to obtain an instruction for the new instrument and directing the instruction to the new instrument. This may be achieved by interposing a translator module between a bus connecting the new instrument to the remaining instruments, and storing the instruction repository in the translator module. The instruction repository is preferably re-configurable dependent on the obsolete instrument and/or the new instrument. In one embodiment, the instruments are controlled via a control system, the control system monitors a bus connecting the instruments together to detect a new instrument, and when a new instrument is detected, the instruction repository is configured dependent on the new instrument. This is similar to a plug-and-play type of system.

BRIEF DESCRIPTION OF THE DRAWINGS

The following drawings are illustrative of embodiments of the invention and are not meant to limit the scope of the invention as encompassed by the claims.

DETAILED DESCRIPTION OF PREFERRED EMBODIMENTS

Figure 1:
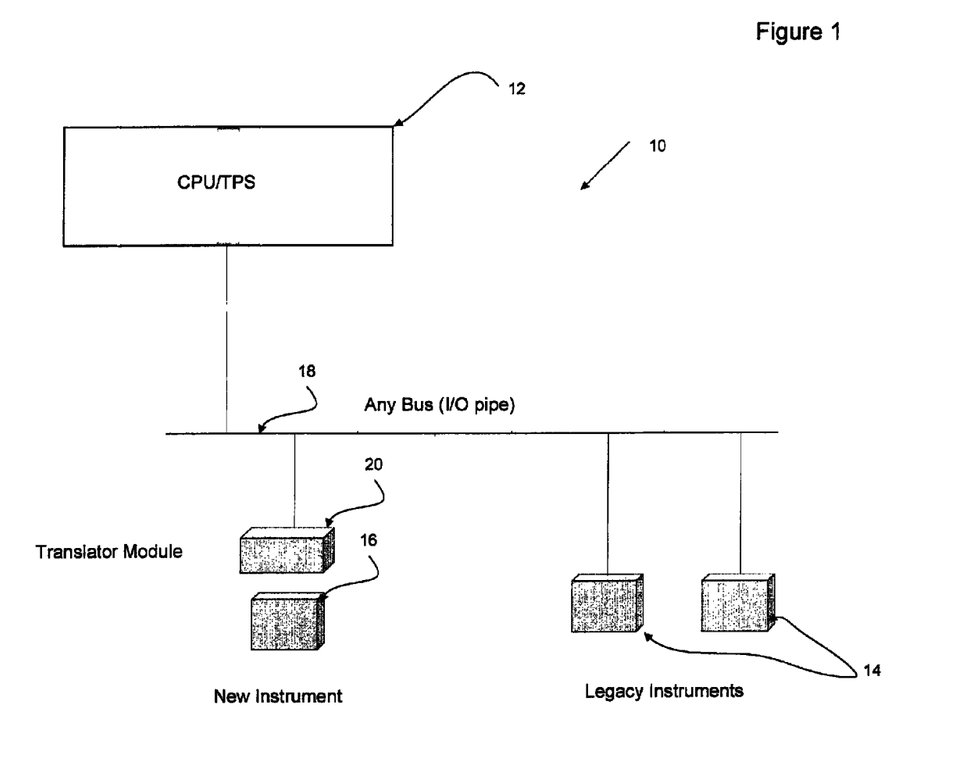
FIG. 1 is an illustration of a system of subsystems in accordance with the invention.

Referring to the accompanying drawings wherein like reference numerals refer to the same or similar elements, FIG. 1 illustrates the hierarchy of a system in accordance with the invention, i.e., a system of subsystems, which is designated generally as 10. The system of subsystems 10 includes one or more control systems 12 (only one of which is shown) which controls test instrument systems, including one or more legacy instruments 14 and a new instrument or set of instruments 16, all of which communicate with one another via a data conduit such as a bus 18 or other input/output pipe (I/O pipe). In accordance with the invention, a translator module 20 is coupled to the new instrument or set of instruments 16, e.g., an interface of the translator module 20 is connected to an interface of the new instrument or set of instruments 16. The translator module 20 is connected to the bus 18 and thus enables communication between the new instrument or set of instruments 16 and the control system 12 and the legacy instruments 14.

Figure 2:
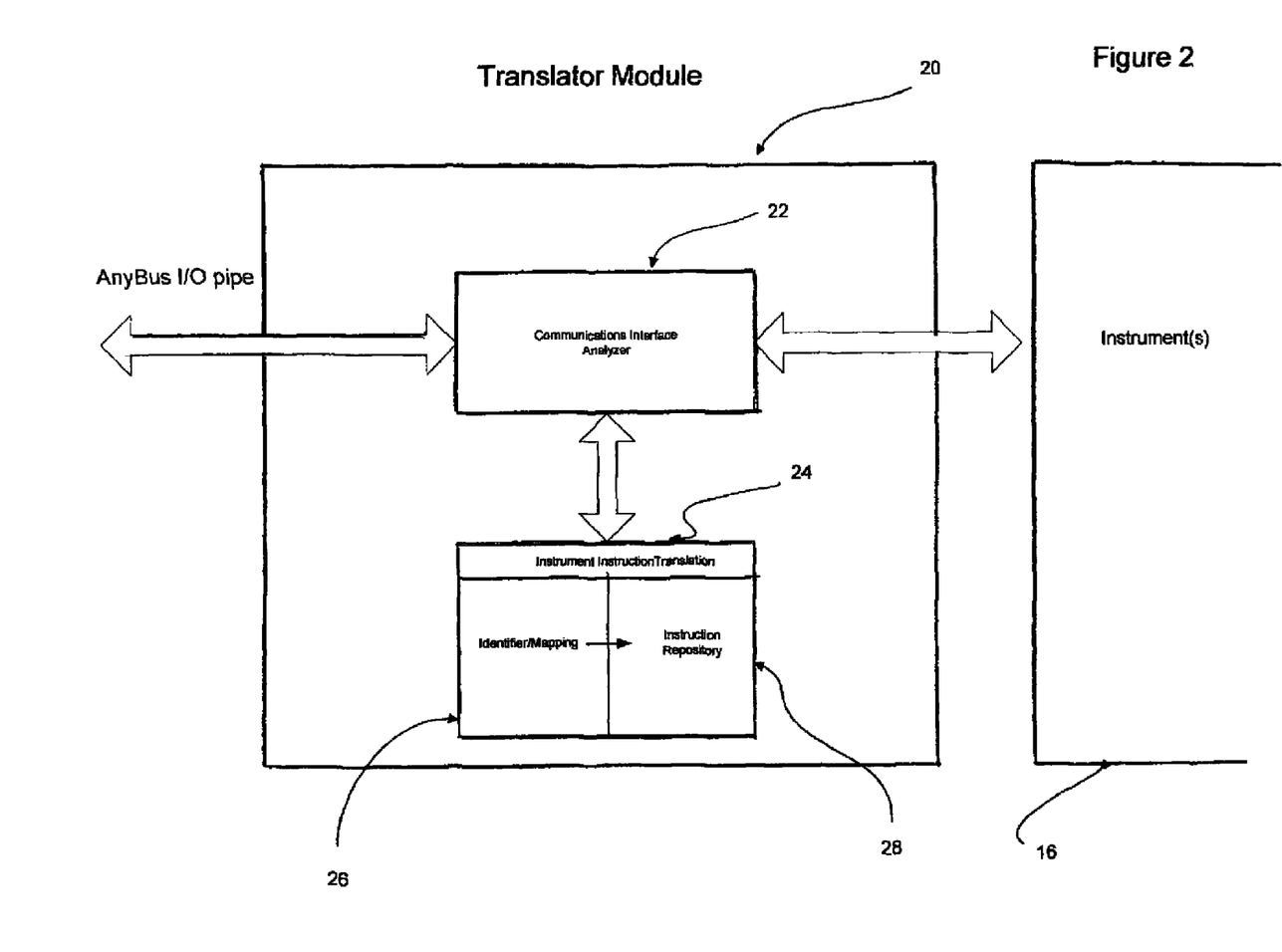
FIG. 2 is an illustration of functional subcomponents in accordance with the invention.

FIG. 2 illustrates an exemplifying functional hierarchy of the translator module 18. A primary component of the translator module 18 is a Communications Interface Analyzer (CIA) 22 which performs three primary functions: 1) it identifies a request to the new instrument or set of instruments 16 from the control system 12 or a legacy instrument 14, 2) it implements the required protocol for instrument communication via the bus 18 and 3) it identifies the Test Program that is running so that certain conditions for a specific TPS can be set. The CIA 22 communicates with an Instrument Instruction Translator 24 which sorts instrument messages, using such technologies but not limited to regular expressions, a regular expression being a string that is used to describe or match a set of strings, according to certain syntax rules, i.e.:
VOLT1:RANG (?<value>.*)
which will match something like "VOLT1:RANG 7" and store the value 7 in a variable called "value",
received over the bus 18, identifies instrument instructions for the obsolete instrument (which has been replaced by the new instrument or set of instruments 16) and maps the obsolete instrument instruction to an instruction repository 28 of compatible instructions for the new instrument or set of instruments 16. The instrument instruction identification and mapping functions are performed by an identifier/mapping section 26 which interacts with the instruction repository 28.

The instruction repository 28 which accepts as input instructions for the obsolete instrument and returns corresponding instructions or a procedure for the new instrument or set of instruments 16 can be created in any way known to those skilled in the art. The results of the directing of the instruction for the new instrument or set of instruments 16 derived from the instruction repository 28 to the new instrument or set of instruments 16 can be directed from the new instrument through the CIA 22 to the bus 18 as reflected by the arrows in FIG. 2. Also, as shown in FIG. 2, there is bi-directional communications between the CIA 22 and the Instrument Instruction Translator 24.

Figure 3:
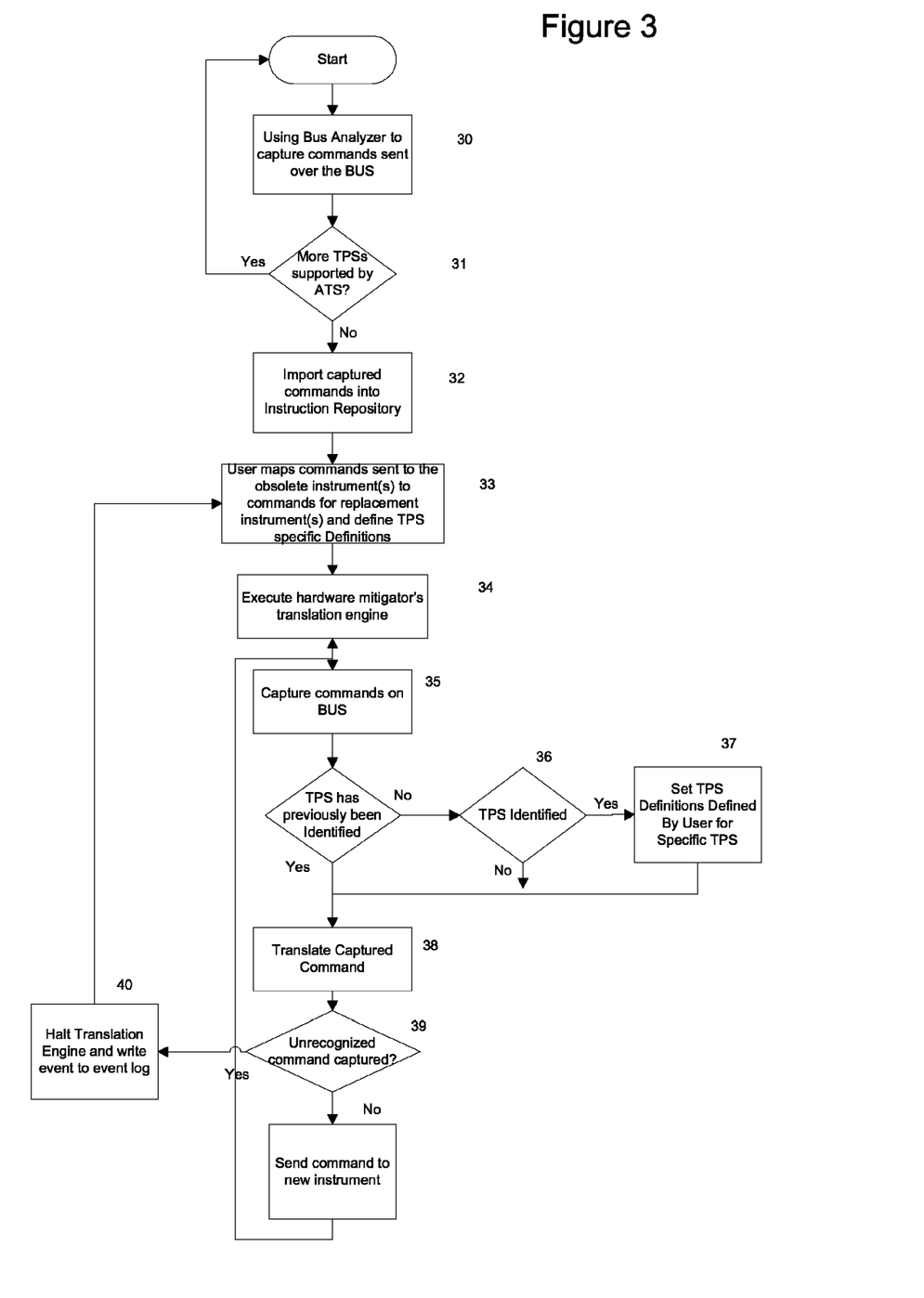
FIG. 3 is a flow chart of a method in accordance with the invention.

FIG. 3 shows a flow chart of an exemplifying method in accordance with the invention for emulating instrument subsystems, namely, an automated test system comprising hardware and software components. The method is effective on the system's hardware, software and test program acceptance methods to achieve transparent obsolescence for the end application. More specifically, the method is designed to receive an instruction for an obsolete instrument which has been replaced by a new instrument or set of new instruments and convert the instruction into a form understandable by the new instrument or set of new instruments. The instruction for the obsolete instrument would be any one which arises during use of the automated test system, i.e., during use of a test program set for the automated test system.

The first step 30 in the method is to capture the commands for the obsolete instruments from a specific TPS supported by the ATS before the obsolete instruments are replaced using, for example, a bus analyzer or software wrapper. This is repeated for all TPS's supported by the ATS. Thus, there is a loop for using the bus analyzer or software wrapper to capture commands sent over the bus until a determination is made at step 31 that there are no more TPS's supported by the ATS.

The second step 32 in the method is for the user to import all the captured commands into the instruction repository.

The third step 33 in the method is for the user to map the commands used by the obsolete instruments to commands or procedures used by the new instrument or set of instruments, as well as defining TPS specific definitions.

The fourth step 34 in the method is for the user to execute the hardware mitigator's translation engine, which would then capture the commands on the Bus (step 35). At this time, the translator engine will attempt to identify the TPS that is currently being executed on the ATS (step 36) (if it has been determined that it has not been previously identified). If the TPS is identified, the TPS specific definitions defined by the user in step 33 are set and executed at their proper times (step 37). The command is then translated using technologies such as, but not limited to, regular expressions (step 38). If the command is not recognized by the translator engine as determined at step 39, the translation engine is halted and the error is written to an event log at step 40. This provides the user with the ability to map the command not recognized by the translation engine (step 33). If the command was translated, then the translated command is sent to the new instrument or set of instruments at step 41.

The method to reconfigure the communications interface analyzer 22 may be accomplished through the use of pluggable technology and is typically separate from the message translation process.

An exemplifying test system to which the invention can be applied includes a computer system having interactive user interfaces and input/output pipe hardware acting under software control as command and control instrument interfaces. The computer system includes interactive user interfaces including, but not limited to, a graphical user interface (video display), a hardcopy interface (printed output), a pointing device, keyboard and/or foot switch interface (user input), personal computing bus architectures IDE/EIDE/ISA/PCI/PCIX/SATA (multimedia and mass storage interfaces), one or more of several implementations of instrument command and control bus interface functions (COM, GPIB, MXI-2, MXI-3, MXI-4, USB, LAN/LXI), an Internet/networking/instrument control bus (FTP/IP), as well as the hardware components associated with these interfaces, if any.

Applying the methods in accordance with the invention, it becomes possible to effectively implement independent firmware modifications while eliminating risk to peripheral system hardware elements or software application test programs. In other words, the peripheral system hardware elements will continue to function as they did prior to replacement of the obsolete instrument or set of instruments, yet interacting with a new instrument without incurring damage arising from the presence of the new instrument, e.g., incompatibility issues.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for replacing an obsolete instrument or set of instruments in an automated test system or automatic test equipment while maintaining functionality provided by the obsolete instrument or set of instruments and allowing continued use of test program sets including commands for the obsolete instrument or set of instruments, comprising:
   providing a new instrument or set of instruments capable of providing the same functions as the obsolete instrument or set of instruments;
   monitoring a data conduit of the automated test system or automatic test equipment for instructions for the obsolete instrument or set of instruments;
   coupling a translator module to the data conduit;
   storing in the translator module, a plurality of instructions or procedures for the new instrument or set of instruments in correspondence with a plurality of instructions for the obsolete instrument or set of instruments to thereby form an instruction repository in the translator module; and
   when an instruction for the obsolete instrument or set of instruments is detected, translating the instruction for the obsolete instrument or set of instruments into an instruction or procedure for the new instrument or set of instruments by inputting the instruction for the obsolete instrument or set of instruments into the translator module and obtaining as output from the translator module, one of the stored instructions for the new instrument or set of instruments that corresponds to and is a substitute for the input instruction for the obsolete instrument or set of instruments; and
   executing the stored instruction output from the translator module at the new instrument or set of instruments to provide the same functionality to the test program sets via the new instrument or set of instruments as the obsolete instrument or set of instruments.

2. The method of claim 1, further comprising interposing the translator module between the new instrument or set of instruments and the data conduit.

3. The method of claim 2, wherein translation of the instruction for the obsolete instrument or set of instruments into an instruction for the new instrument or set of instruments comprises mapping the instruction for the obsolete instrument or set of instruments into an instruction for the new instrument or set of instruments using the instruction repository.

4. The method of claim 1, wherein the step of storing the plurality of instructions for the new instrument or set of instruments in correspondence with a plurality of instructions for the obsolete instrument or set of instruments in the translator module comprises:
   identifying instructions for the obsolete instrument or set of instruments utilized in each of the test program sets in a preparatory stage;
   deriving for each utilized instruction, one or more corresponding instructions for the new instrument or set of instruments; and then
   storing in the instruction repository, a mapping of the utilized instructions for the obsolete instrument or set of instruments and the derived corresponding instructions for the new instrument or set of instruments.

5. The method of claim 1, further comprising reconfiguring the instruction repository in the translator module dependent on the obsolete instrument or set of instruments and/or the new instrument or set of instruments.

6. The method of claim 1, wherein the new instrument or set of instruments is able to interact with peripheral system hardware elements or software applications test programs of the automated test system or automatic test equipment without risk and in the same manner as they interacted with the obsolete instrument or set of instruments.

7. The method of claim 1, wherein the step of storing the plurality of instructions for the new instrument or set of instruments in correspondence with the plurality of instructions for the obsolete instrument or set of instruments to thereby form an instruction repository in the translator module occurs in a preparatory stage and the steps of translating the instruction for the obsolete instrument or set of instruments into an instruction or procedure for the new instrument or set of instruments executing the stored instruction output from the translator module at the new instrument or set of instruments to provide the same functionality to the test program sets via the new instrument or set of instruments as the obsolete instrument or set of instruments occur in an operational stage that takes place after the preparatory stage.

8. In an automated test system including a plurality of instruments, a hardware data conduit for connecting the instruments together, and test program sets executable for those instruments, wherein the automated test system comprising:
a new instrument whose instructions and/or procedures are not executable by the test program sets, the new instrument being a replacement for an obsolete one of the plurality of instruments or obsolete set of the plurality of instruments executable by the test program sets and being capable of similar functions as the obsolete instrument or set of instruments; and
a translator module that translates instructions for the obsolete instrument or set of instruments into the instructions and/or procedures for said new instrument whereby said new instrument thus functions in the same manner as the obsolete instrument or set of instruments when the test program sets are executed on the automated test system,
said translator module comprising an instrument instruction translator having stored the instructions and/or procedures for said new instrument in correspondence with instructions for the obsolete instrument or set of instruments to thereby form an instruction repository in the translator module and being configured to use the instruction repository to provide, in response to receiving an identified one of the instructions for the obsolete instrument or set of instruments, an instruction and/or procedure for said new instrument that corresponds to and is a substitute for the received instruction of the obsolete instrument or set of instruments.

9. The automated test system of claim 8, wherein said translator module further comprises a communications interface analyzer that identifies instructions for the obsolete instrument or set of instruments and implements an interface of said new instrument for required communications protocol.

10. The automated test system of claim 9, wherein:
said instrument instruction translator provides the instruction and/or procedure for said new instrument that corresponds to and is a substitute for the received instruction of the obsolete instrument or set of instruments to said communications interface analyzer such that there is bi-directional communications between said instrument instruction analyzer and said communications interface analyzer, and
said communications interface analyzer directs the instruction and/or procedure for said new instrument received from said instrument instruction translator to said new instrument.

11. The automated test system of claim 8, wherein said translator module is interposed between said new instrument and the data conduit.

12. The automated test system of claim 8, wherein said new instrument is able to interact with peripheral system hardware elements or software applications test programs of the automated test system or automatic test equipment without risk and in the same manner as they interacted with the obsolete instrument or set of instruments.

13. A method for enabling continued use of a test program set executed for a first set of instruments when at least one instrument of the first set is obsoleted and replaced by a new instrument to thereby form a second set of instruments, comprising:
identifying a plurality of instructions for the obsoleted at least one instrument utilized in the test program set;
determining a plurality of instructions or procedures for the new instrument that correspond to and substitute for the identified instructions for the obsoleted at least one instrument;
storing the identified instructions for the obsoleted at least one instrument with the corresponding instructions or procedures for the new instrument in a translator module to thereby form an instruction repository in the translator module;
determining when the test program set generates an instruction for the obsoleted at least one instrument; and
when the test program set generates an instruction for the obsoleted at least one instrument, mapping the instruction using the instruction repository in the translator module to obtain an instruction or procedure for the new instrument and directing the instruction or procedure to the new instrument.

14. The method of claim 13, further comprising interposing the translator module between a data conduit connecting the new instrument to the remaining instruments.

15. The method of claim 13, further comprising reconfiguring the instruction repository dependent on the obsoleted at least one instrument and/or the new instrument.

16. The method of claim 13, further comprising:
controlling the instruments via a control system;
directing the control system to monitor a data conduit connecting the instruments together to detect a new instrument; and
when a new instrument is detected, configuring the instruction repository dependent on the detected new instrument.

17. The method of claim 13, wherein the new instrument is able to interact with peripheral system hardware elements or software applications test programs without risk and in the same manner as they interacted with the obsoleted at least one instrument.

18. The method of claim 13, wherein the steps of identifying a plurality of instructions for the obsoleted at least one instrument, determining the instructions for the new instrument that correspond to the identified instructions for the obsoleted at least one instrument, and storing the identified instructions for the obsoleted at least one instrument with the corresponding instructions for the new instrument in a translator module to thereby form an instruction repository in the translator module occur in a preparatory stage and the steps of determining when the test program set generates an instruction for the obsoleted at least one instrument and mapping the instruction using the instruction repository in the translator module occur in an operational stage that takes place after the preparatory stage.

19. The method of claim 13, wherein the step of identifying a plurality of instructions for the obsoleted at least one instrument comprises analyzing the test program set to determine which instructions for the obsoleted at least one instrument are utilized therein.

* * * * *

UNITED STATES PATENT AND TRADEMARK OFFICE
CERTIFICATE OF CORRECTION

| | | |
|---|---|---|
| PATENT NO. | : 8,359,585 B1 | Page 1 of 1 |
| APPLICATION NO. | : 11/938991 | |
| DATED | : January 22, 2013 | |
| INVENTOR(S) | : Spinner et al. | |

It is certified that error appears in the above-identified patent and that said Letters Patent is hereby corrected as shown below:

Title page, item (73), second line, change "Happauge" to --Hauppauge--.

Signed and Sealed this
Eleventh Day of March, 2014

Michelle K. Lee
*Deputy Director of the United States Patent and Trademark Office*